June 24, 1930.                W. A. MARRISON                1,768,262
PHASE MEASURING SYSTEM AND METHOD
Filed Feb. 7, 1928

INVENTOR:
WARREN A. MARRISON
By J. P. Neville
ATTORNEY

Patented June 24, 1930

1,768,262

UNITED STATES PATENT OFFICE

WARREN A. MARRISON, OF ORANGE, NEW JERSEY, ASSIGNOR TO BELL TELEPHONE LABORATORIES, INCORPORATED, OF NEW YORK, N. Y., A CORPORATION OF NEW YORK

PHASE MEASURING SYSTEM AND METHOD

Application filed February 7, 1928. Serial No. 252,628.

This invention relates to phase measuring and more particularly to methods of and means for utilizing a cathode ray oscillograph for that purpose.

An object of the invention is to provide a simple and effective means for measuring phase shift.

In one specific embodiment, the invention will be herein disclosed as used to measure the phase relation of two waves. In this embodiment the two waves to be measured are applied to a cathode ray oscillograph which is provided with a plurality of pairs of deflector plates and in addition with a pair of coils arranged to be rotated about the axis of the cathode beam of the oscillograph. One wave is passed through a resistance-condenser phase splitter to produce two quadrature components which are impressed on the two pairs of deflector plates to cause a circular pattern to be produced on the screen of the oscillograph. The other wave is impressed on the rotatable coils the ampere turns of which are so adjusted that the deflection produced by them is twice the radius of the circle. The coils are then adjusted to a position such that the figure on the screen is a straight line. The angle of slope of this straight line is a direct measure of the phase difference of the waves.

This invention, either in the above embodiment or in various modifications thereof, has been found to be well suited for measuring the phase shift of transmission networks. When so employed an electrical wave is transmitted through the network under test and the waves at the input and output terminals of the network are compared.

This invention will be more readily understood by reference to the following detailed description taken in connection with the drawing, in which.

Figure 1:
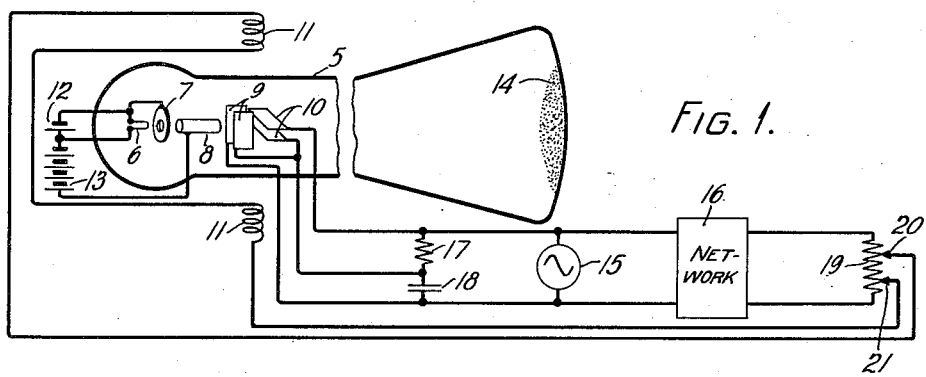
Fig. 1 shows diagrammatically one embodiment thereof employing a cathode ray oscillograph equipped with deflector plates and coils for measuring the phase shift of an electrical transmission network.
Figure 2:
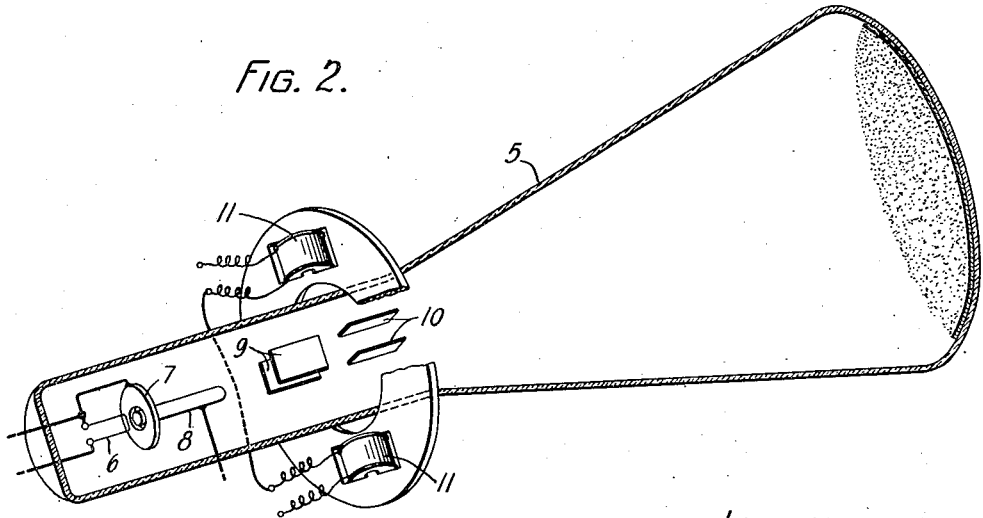
Fig. 2 shows a perspective view of the cathode ray oscillograph employed in the circuit of Fig. 1.

Referring to Fig. 1, there is shown a cathode ray oscillograph 5 preferably of the type shown in Van der Bijl Patent 1,565,873 of December 15, 1925, having a filamentary cathode 6, a screening electrode 7, an anode 8, two pairs of deflector plates 9 and 10, and deflecting coils 11. The mechanical construction of the oscillograph is better illustrated in Fig. 2. It may be seen from this figure that the coils 11 are so mounted outside of the tube that they may be rotated about it.

The cathode 6 is supplied with heating current from a battery 12 which causes it to glow and emit electrons. These electrons are set into motion due to the effect of the high positive potential applied to the anode 8 by the battery 13. The stream of electrons so set up impinges on the fluorescent surface 14 causing it to glow. The electron stream is deflected by the action of the two pairs of deflector plates 9 and 10 and the deflector coils 11, as is well understood in the art.

Waves from a source 15 are transmitted through the network 16 under test. A resistance 17 and a condenser 18 are connected in series across the input terminals of the network 16. These impedance elements serve as a phase splitter for obtaining quadrature components of the input voltage which are applied to the respective pairs of deflector plates 9 and 10.

As is well understood in the art, when the values of the resistance and capacity elements, R and c respectively, are so proportioned that $$R = \frac{1}{\omega c}$$

the pattern formed on the screen 14 by the electron beam is a circle when the input is free from harmonics. The equations of motion for the beam expressed in polar coordinates, are $$r = a\, m$$
$$\phi = \omega t + \theta$$

in which $r$ and $\varphi$ are respectively the length and angle of the vector, $m$ is proportional to the sensitivity of the tube, $a$ is proportional to the amplitude of the applied wave, and $\Theta$ is the constant phase displacement introduced to both components by the phase splitting device.

A resistance 19 is connected across the output terminals of the network 16. This resistance is given such value as to properly terminate the network 16. The resistance 19 is provided with adjustable taps 20 and 21 for determining the voltage to be applied to the deflector coils 11. These taps are so adjusted that the deflection produced by the coils alone is $d = 2\,a\,m$.

When this adjustment has been made and with both deflector plates and coils working, we obtain a figure upon the screen 14 the shape of which is a function of the phase angle between the voltages at the input and output terminals of the network 16 and of the orientation of the coils 11. This figure will in general be an ellipse, but there is one and only one position of the coils for which the ellipse degenerates to a straight line, which slopes in a direction parallel to the axis of the coils. The angle of slope of the straight line is a direct measure of the phase relation between the voltages at the input and output terminals of the network 16.

Therefore, by so adjusting the coils 11 that the figure on the screen is a straight line, it is possible to determine the relative phase of the voltages at the input and output terminals of the network 16 from the slope of the straight line image.

Figure 3:
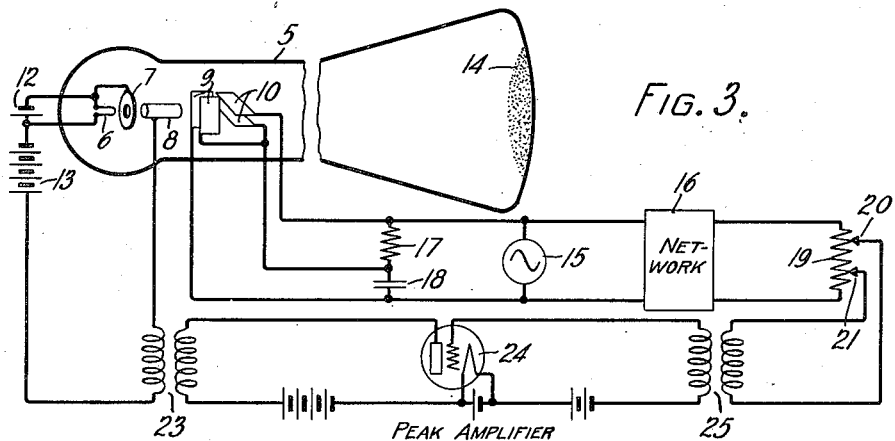
Fig. 3 shows diagrammatically a second embodiment of the invention employing a cathode ray oscillograph equipped only with deflector plates.

Fig. 3 shows another embodiment of the invention in a cathode ray oscillograph circuit for measuring the phase shift produced by an electrical network. The cathode ray oscillograph 5 employed in this embodiment is similar in construction to that used in the embodiment of Fig. 1 except that the deflector coils are not employed.

The secondary winding of a transformer 23 is connected in series with the battery 13 in the cathode-anode circuit. The primary winding of the transformer 23 is connected to the output of a peak amplifier circuit comprising a vacuum tube 24, an input transformer 25, and the usual cathode heating, plate current and grid biasing batteries.

As is well understood in the art, in such an amplifier the biasing potential applied to the grid is made sufficiently high so that only the peaks of the input waves are amplified.

As in the circuit of Fig. 1, a resistance-condenser network 17—18 is connected across the input of the network 16 under test to obtain quadrature components of the input voltage which are supplied to the pairs of deflector plates 9 and 10 to produce a circular image upon the screen 14.

The primary winding of the transformer 25 is connected to the taps 20 and 21 of the resistance 19, so that the output wave from the network 16 is amplified in the peak amplifier 24 and the resulting impulses are supplied to the anode-cathode circuit through the transformer 23. The effect of these impulses upon the image formed on the screen 14 will be to modify the image to, in effect, produce a pointer on the circle produced thereon by the action of the voltages supplied to the deflector plates 9 and 10. The position at which this pointer appears is determined by the angle $\varphi$ at the instant of the change in tube sensitivity due to the impulse impressed on the cathode-anode circuit. The location of the pointer on the circle is therefore a direct measure of the phase relation of the voltages at the input and output terminals of the network 16.

Instead of applying the impulse to the anode-cathode circuit of the oscillograph 5, a grid or auxiliary plate electrode may be incorporated in the tube 5 and the pulse voltage applied between that element and the cathode to modify the image.

Other means for producing pulses on the same part of each cycle may be used instead of the peak amplifier.

What is claimed is:

1. A circuit for measuring the phase relation of two waves comprising a cathode ray device including means for producing a beam of cathode rays and means for receiving said beam to produce a visible image by means of the ray impact, means for controlling the position of the ray in a plurality of different directions in accordance with one wave, and adjustable means for affecting the ray in accordance with the other wave to obtain a characteristic image, whereby the phase relation of the waves may be determined from the characteristics of the resulting image.

2. A circuit for measuring the phase relation of two waves comprising a cathode ray device including means for producing a beam of cathode rays and means for receiving said beam to produce a visible image by means of the ray impact, means for controlling the position of the ray in accordance with one wave to form a circular image and adjustable means for controlling the ray in accordance with the other wave to change the circular to a straight line image.

3. A circuit for measuring the phase relation of two waves comprising a cathode ray oscillograph having means for producing a beam of cathode rays, two pairs of deflector plates, and a coil arranged to be rotated around the axis of the cathode beam, means for producing from one of said waves two phase quadrature components, means for impressing said components upon the pairs of deflector plates, respectively, and means for impressing the other wave upon the coil.

4. A circuit for measuring the phase relation of two electrical waves comprising a cathode ray oscillograph including means for producing a beam of cathode rays, a plurality of pairs of deflector plates and a coil mounted with its axis perpendicular to the axis of the cathode beam and capable of rotation about that axis, a network including a resistance element and a capacity element connected in series, means for impressing one of the waves upon said network to produce electromotive forces across the resistance and capacity elements, means for impressing the electromotive forces across the resistance and capacity elements, respectively, on two pairs of said deflector plates respectively, and means for impressing the other wave on said coil.

5. The method of using a cathode ray oscillograph having means for producing a beam of cathode rays to measure the phase shift produced by a transmission network which comprises transmitting a wave through said network obtaining waves representing respectively said wave before and after it is transmitted therethrough, employing one of said waves to deflect the beam in a plurality of directions to form an image, and employing the other of said waves for affecting the beam to modify said image so that the phase shift may be determined.

6. The method of measuring the phase relation of two waves by means of a cathode ray oscillograph provided with a plurality of pairs of deflector plates, and a coil arranged to be rotated about the oscillograph, which method comprises impressing two quadrature components of one wave upon two of said pairs of plates, respectively, impressing the other wave upon the coil, and rotating the coil until the image produced by the oscillograph is a straight line.

7. The method of using a cathode ray oscillograph to measure the phase shift produced by a transmission network which comprises transmitting an electrical wave through said network, obtaining voltage waves representing respectively said wave before and after it is transmitted therethrough, employing one of said voltage waves to cause said oscillograph to produce a substantially circular figure, and employing the other of said voltage waves to modify said figure so that the phase shift may be determined.

8. The method of measuring the phase relation of two waves by means of a cathode ray oscillograph having means for producing a beam of cathode rays and a plurality of means for deflecting the cathode beam, the deflecting means being adjustable relative to one another, which comprises impressing said waves on two of said deflecting means respectively, adjusting said deflecting means relative to one another until the image produced is a straight line, and determining the phase relation of said waves from the slope of the straight line.

In witness whereof, I hereunto subscribe my name this 3rd day of February, 1928.

WARREN A. MARRISON.